United States Patent
Kern et al.

[15] 3,652,205
[45] Mar. 28, 1972

[54] PROCESS FOR THE MANUFACTURE OF MADRELL'S SALT

[72] Inventors: Winfried Kern, Hurth near Cologne; Gero Heymer, Knapsack near Cologne; Heinz Harnisch, Lovenich near Cologne, all of Germany

[73] Assignee: Knapsack Aktiengesellschaft, Knapsack near Cologne, Germany

[22] Filed: June 6, 1968

[21] Appl. No.: 734,941

[30] Foreign Application Priority Data

June 27, 1967 Germany.................................K 62653

[52] U.S. Cl. .................................................................23/106
[51] Int. Cl. ........................................................C01b 25/30
[58] Field of Search .....................................23/106, 106 A

[56] References Cited

UNITED STATES PATENTS 2,021,012  11/1935  McCullough.........................23/106 A
2,356,799  8/1944  Taylor et al..............................23/106
2,737,443  3/1956  Wright....................................23/106 A
3,063,801  11/1962  Groves...................................23/106 A

OTHER PUBLICATIONS

Van Wazer, Phosphorus and its Compounds, Vol. 1, pp. 665, 668 (Interscience Pub.– 1958)
Perry, Chem. Engr's Handbook, 4th Ed., Sect. 20, pp. 31–33 (McGraw Hill– 1963)

Primary Examiner—Oscar R. Vertiz
Assistant Examiner—Charles B. Rodman
Attorney—Connolly and Hutz

[57] ABSTRACT

Production of Maddrell's salt by heating feed material consisting of monobasic sodium phosphate to a temperature substantially of 450° C., comprising carrying out the heating step in the temperature range between 200° and 450° C. while maintaining in the feed material a steam partial pressure between 50 and 450 mm. mercury.

10 Claims, 2 Drawing Figures

Production of Maddrell's salt by heating of $NaH_2PO_4$ to 450°C. under various steam partial pressures at various heating rates.

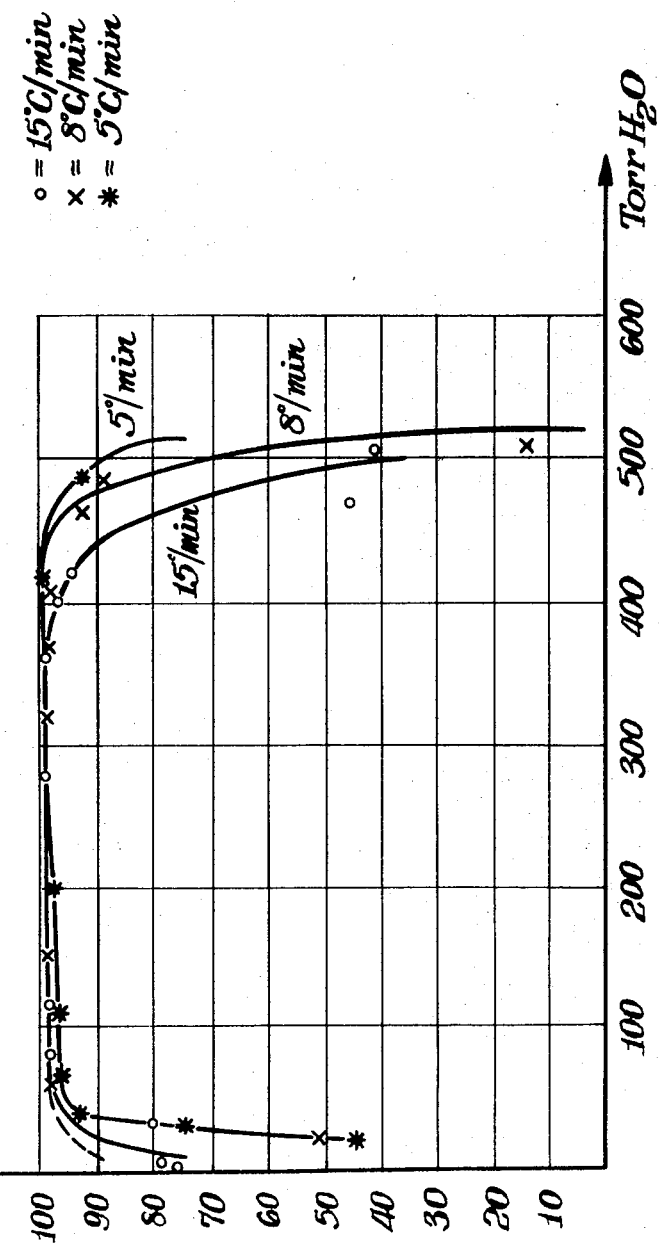

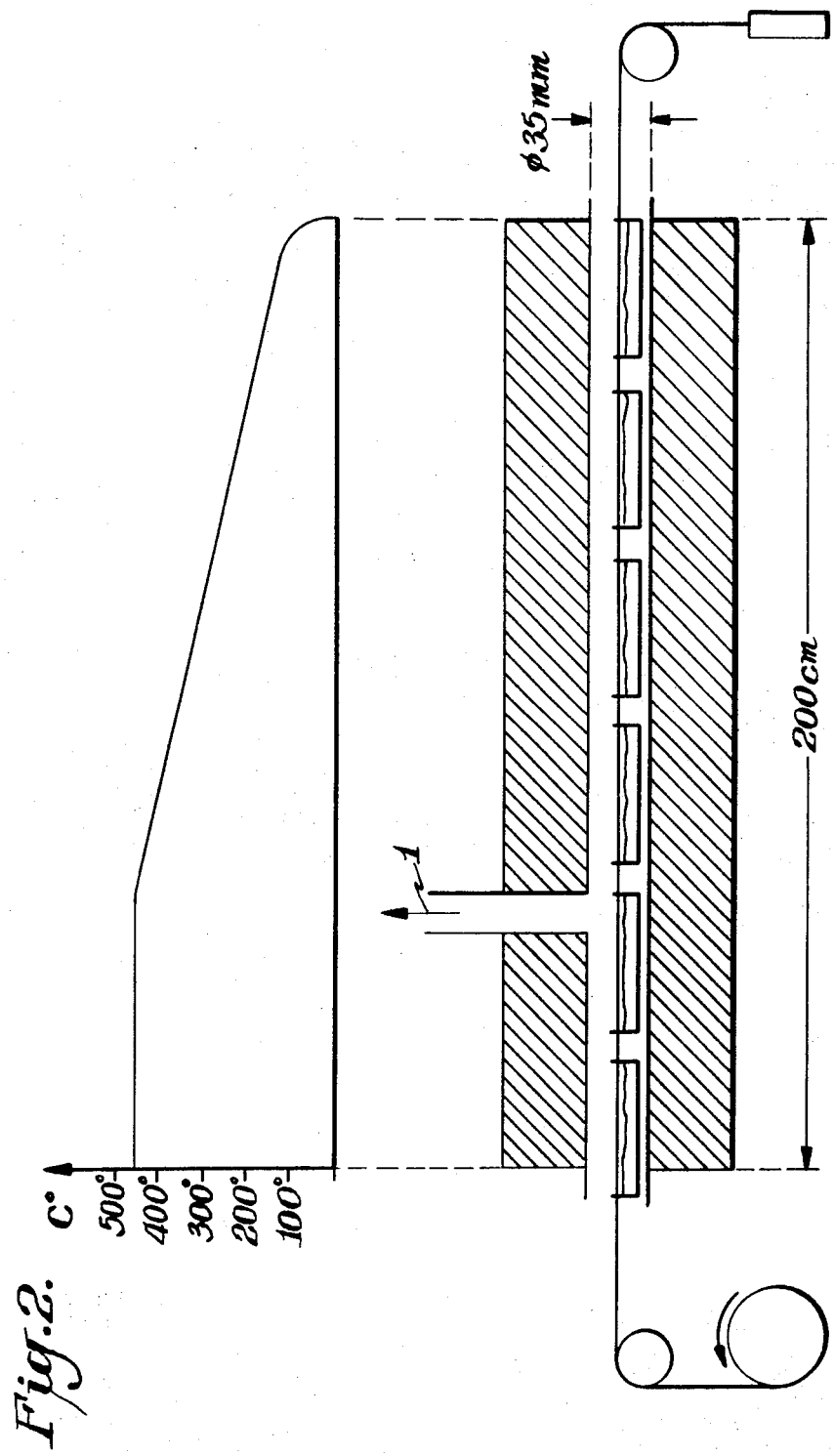

PROCESS FOR THE MANUFACTURE OF MADRELL'S SALT

The present invention relates to a process for the manufacture of water-insoluble sodium polyphosphate, so-called Maddrell's salt, by thermal treatment of monobasic sodium phosphate.

It is known that Maddrell's salt can be produced by dehydration of monobasic sodium phosphate. Depending on the reaction conditions used, the dehydration is found to entail more or less the formation of water-soluble phosphates, such as acid sodium pyrophosphate, sodium trimetaphosphate or long chain soluble polyphosphates.

F. Thilo and R. Ratz in "Zeitschrift fur anorganische und allgemeine Chemie," 258 (1949), page 53, have reported that Maddrell's salt can be produced by heating $NaH_2PO_4$ for some days to temperatures of 350° C. and freeing the resulting product later from soluble phosphates, which are present or have formed despite the long heating periods, by washing with water.

D.E.C. Corbridge and F.R. Tromans (Analytical Chemistry 30 (1958), pages 1,101 – 1,110) also produce Maddrell's salt by subjecting $NaH_2PO_4$ to thermal treatment over days at 380° C. and washing later the resulting heat-treated product.

A commercial process for making Maddrell's salt has been disclosed in U.S. Pat. No. 2,356,799, wherein $NaH_2PO_4$ moistened with up to 5 % water is compressed into pellets which are heated later in a stream of hot air to a temperature between 300° and 460° C., in a rotary kiln. The resulting products are formed of only 95 percent of Maddrell's salt (cf. Journal of American Chemical Society, 81 (1959), page 79) and contain varying proportions of soluble phosphates, which are practically always above 1 percent by weight.

In "Handbuch der praparativen anorganischen Chemie," published by Ferdinand Enke Verlag, Stuttgart, Brauer has reported that the production of Maddrell's salt was sometimes found to fail completely for unknown reasons.

In many cases, it is desirable to produce Maddrell's salt in a form fairly free from water-soluble phosphates, especially when the salt is intended for use as a polishing agent for tooth pastes. More particularly, it is desirable to obtain products containing less than 1 percent by weight of soluble phosphates, which are known to have strong complex-forming properties and, therefore, a deleterious effect upon tooth enamel.

It has now unexpectedly been found that the transformation of $NaH_2PO_4$ into Maddrell's salt is a function of the steam partial pressure prevailing in the reaction material.

As shown in the following table, the transformation of $NaH_2PO_4$ into Maddrell's salt is more especially a function of the steam partial pressure in the critical temperature range between 200° and 450° C.

TABLE I:

Heat Treatment of $NaH_2PO_4$ at a Heating Rate of 15° C. Per Minute.

| Steam partial pressure in mm. mercury, in the temperature range between 20° and 200° C. | Steam partial pressure in mm. mercury, in the temperature range between 200° and 450° C. | Weight percent Maddrell's salt The balance to give 100 corresponds to quantity of soluble phosphates |
|---|---|---|
| 280 | 280 | 99.4 |
| 470 | 300 | 98.4 |
| 300 | 470 | 62.0 |

The present process for the production of Maddrell's salt by heating feed material consisting of monobasic sodium phosphate to a temperature of 450° C. comprises more especially carrying out the heating step in the temperature range between 200° and 450° C. while maintaining in the feed material a steam partial pressure between 50 and 450 mm. mercury.

The steam partial pressure desired to prevail within the critical temperature range defined above can be produced by regulation of the heating rate and/or by the simultaneous passage of a gas poor in steam, particularly air, over the reaction gas.

The heating rate for the feed material should preferably be regulated by conveying the said feed material through a heating zone arranged to establish a suitable temperature curve therein. The heating rates should advantageously be selected lower than 50° C. per minute, more advantageously lower than 30° C. per minute.

It has also been found advantageous to use as the feed material $NaH_2PO_4$ with a surface area of at least 0.1 square meter per gram, determined by the BET-method. This material can preferably be produced by the vacuum drying of $NaH_2PO_4 \cdot 2 H_2O$ or by the spray-drying of a $NaH_2PO_4$—solution, more preferably by the drying of $NaH_2PO_4 \cdot 2 H_2O$ in vacuo at a pressure of less than 80 mm. mercury. Still further, it has been found advantageous, in the temperature range between 200° and 450° C., to impart to the reaction material normally in horizontal motion an additional rotary motion, so as to accelerate steam diffusion.

Given that the steam partial pressure prevailing in the feed material is outside of the limits specified above, the $NaH_2PO_4$ is found during the heat treatment to 450° C. to be transformed into Maddrell's salt plus a considerable proportion of sodium trimetaphosphate.

In the following tabulated Examples, the $NaH_2PO_4$ was heated to 450° C. at heating rates of 15° C., 8° C. and 5° C. per minute under different steam partial pressures, and the proportion of Maddrell's salt contained in the final products was determined by analysis.

The individual results obtained are graphically plotted in FIG. 1 of the accompanying graph.

TABLE II:

| Heating rate in °C. per minute | Steam partial pressure in mm. mercury | Quantity of Maddrell's salt in % by weight; the balance to give 100 is formed of soluble phosphates. |
|---|---|---|
| 15 | 3 | 76.5 |
| 15 | 8 | 78.7 |
| 15 | 34 | 80.0 |
| 15 | 80 | 98.5 |
| 15 | 120 | 99.0 |
| 15 | 280 | 99.4 |
| 15 | 365 | 99.3 |
| 15 | 405 | 97.6 |
| 15 | 410 | 95.2 |
| 15 | 470 | 45.0 |
| 15 | 505 | 41.0 |
| 8 | 20 | 51.0 |
| 8 | 60 | 98.5 |
| 8 | 150 | 98.7 |
| 8 | 320 | 99.1 |
| 8 | 410 | 99.0 |
| 8 | 465 | 93.0 |
| 8 | 485 | 89.0 |
| 8 | 505 | 19.0 |
| 5 | 22 | 45.0 |
| 5 | 32 | 75.0 |
| 5 | 40 | 94.1 |
| 5 | 63 | 97.9 |
| 5 | 116 | 98.0 |
| 5 | 196 | 98.5 |
| 5 | 368 | 99.3 |
| 5 | 418 | 99.8 |
| 5 | 490 | 93.0 |

The $NaH_2PO_4$ used in all of the above examples had a surface of 0.25 square meters/gram, determined by the BET-method.

Maddrell's salt should be conveniently produced in an apparatus such as that shown diagrammatically in the accompanying drawing, FIG. 2.

A kiln 2 meters long was provided with heating windings (not shown in the drawing) so as to establish therein a temperature curve such as that shown in the drawing, and small stainless steel boats filled with $NaH_2PO_4$ were slowly conveyed through the kiln, at a constant velocity. Depending on the boat velocity, air was exhausted from the kiln, near 1, so as to establish in the feed material a steam partial pressure within the range specified above.

EXAMPLE 1

500 grams $NaH_2PO_4$, placed in 10 small stainless steel boats, were conveyed through a kiln such as that shown in FIG. 2 at a velocity of 5.5 cm./minute, corresponding to a temperature increase of 12.5° C./minute. Within the temperature range of 200° to 450° C., air was exhausted at a rate of 240 liters/hour. The mean steam partial pressure was found to be 105 mm. mercury.

The resulting final product (425 grams) was formed of 99.4 percent Maddrell's salt and obtained in the form of a readily friable cake, easy to remove from the boats. The product contained 0.6 percent soluble matter.

EXAMPLE 2

500 grams $NaH_2PO_4$, placed in 10 small stainless steel boats, were conveyed through a kiln such as that shown in FIG. 2 at a velocity of 7 cm./minute, corresponding to a temperature increase of 16° C./minute. Air was exhausted at a rate of 360 liters/hour and the steam partial pressure was 90 mm. mercury. The final product (425 grams) was formed of 99.1 percent Maddrell's salt and readily friable. It contained 0.9 percent soluble matter.

Upon increasing the boat velocity, it was necessary to exhaust air at an overproportional rate. The reason for this was that the high heating rates prevented the steam from diffusing rapidly enough from the sample.

EXAMPLE 3

500 grams $NaH_2PO_4$ were conveyed in the manner described in the preceding Examples through a kiln such as that shown in FIG. 2, at a constant velocity of 8 cm./minute, corresponding to a temperature increase of 18.5° C./minute. Air was exhausted at a rate of 440 liters/hour and the steam partial pressure was 85 mm. mercury. The final product (425 grams) was formed of 96 percent Maddrell's salt and 4 percent soluble matter.

Upon increasing the rate of exhausted air, it was found that even a heating rate of 18.5° C./minute still enabled final products with a minimum proportion of 99 percent Maddrell's salt to be obtained.

EXAMPLE 4

500 grams $NaH_2PO_4$ were conveyed in the manner described in the preceding Examples through the kiln, at a velocity of 8 cm./minute., corresponding to a temperature increase of 18.5° C./minute. Air was exhausted at a rate of 800 liters/hour and the steam partial pressure was 50 mm. mercury.

The resulting final product was formed of 99.2 percent Maddrell's salt and 0.8 percent soluble matter.

Upon exhaustion of too small a quantity of air or upon arresting the exhaustion, which resulted in a higher steam partial pressure outside of the preferred range, trimetaphosphate was found to have formed even in the apparatus of FIG. 2.

EXAMPLE 5

450 grams $NaH_2PO_4$, placed in nine small stainless steel boats, were conveyed through the kiln at a velocity of 3.6 cm./minute, corresponding to a heating rate of 8.3° C./minute, the exhaustion of air being arrested. The first boat was found to contain substantially pure Maddrell's salt (99 percent Maddrell's salt plus 1 percent sodium trimetaphosphate). The second boat was found to contain strongly sintered final product, which contained no more than 77 percent Maddrell's salt plus 23 percent sodium trimetaphosphate. The third and the following six boats contained very strongly sintered and fused final products, which were found to contain Maddrell's salt in a proportion of 50 percent and even less.

The above experiment was repeated under inversed conditions, i.e., by heating $NaH_2PO_4$ under too low a $H_2O$—partial pressure, in the kiln of FIG. 2.

EXAMPLE 6

50 grams $NaH_2PO_4$, placed in a small stainless steel boat, were conveyed through a kiln at a velocity of 1.8 cm./minute, corresponding to a temperature increase of 4.1° C./minute. Air was exhausted at a rate of 2,600 liters/hour and the steam partial pressure was 2 mm. mercury. The final product was found to contain 75 percent Maddrell's salt and 25 percent soluble matter.

It was also found as has already been mentioned above that $NaH_2PO_4$ samples with a large surface area, such as those obtained by vacuum or spray drying, were particularly useful for transformation into Maddrell's salt.

EXAMPLE 7

$NaH_2PO_4 \cdot 2H_2O$, which had been prepared by reaction of stoichiometric proportions of phosphoric acid (85 percent by weight) and sodium hydroxide solution (50 percent by weight) followed by recrystallization, filtration and washing with alcohol, was freed from water of crystallization by treatment in a vacuum drying cabinet at 90° C. at pressures of 10, 20, 40, 60, 80 and 100 mm. mercury, respectively.

50 grams each of the resulting final products were placed in a small stainless steel boat and conveyed in the manner described in the preceding Examples through a kiln such as that shown in FIG. 2, at a velocity of 4.6 cm./minute, corresponding to a temperature increase of 10.6° C./minute, and an air exhaustion rate of 50 liters/hour.

The steam partial pressure was 150 mm. mercury.

The test results obtained are compiled in the following Table:

| Drying $NaH_2PO_4 \cdot 2H_2O$ at mm. mercury | Surface area of $NaH_2PO_4$ in square meters/gram | Particle size distribution of $NaH_2PO_4$ | Quantity [1] |
|---|---|---|---|
| 1 | 0.32 | $8\% < 40\mu < 7\% < 60\mu < 11\% < 100\mu$ $100\mu < 24\% < 200\mu < 50\%$ | 99.7 |
| 10 | 0.20 | $16\% < 40\mu < 6\% < 60\mu < 8\% < 100\mu$ $100\mu < 21\% < 200\mu < 49\%$ | 99.7 |
| 20 | 0.15 | $4\% < 40\mu < 8\% < 60\mu < 8\% < 100\mu$ $100\mu < 21\% < 200\mu < 59\%$ | 99.4 |
| 40 | 0.14 | $2\% < 40\mu < 6\% < 60\mu < 20\% < 100\mu$ $100 < \mu 28\% < 200\mu < 44\%$ | 98.7 |
| 60 | 0.16 | $1\% < 40\mu < 6\% < 60\mu < 29\% < 100\mu$ $100\mu < 32\% < 200\mu < 32\%$ | 99.4 |
| 80 | [2] $\ll 0.1$ | $2\% < 40\mu < 4\% < 60\mu < 22\% < 100\mu$ $100\mu < 26\% < 200\mu < 44\%$ | 94.7 |
| 100 | [2] $\ll 0.1$ | $1\% < 40\mu < 8\% < 60\mu < 9\% < 100\mu$ $100\mu < 22\% < 200\mu < 60\%$ | 46 |
| Spray-dried | 0.25 | $46\% < 40\mu < 15\% < 60\mu < 16\% < 100\mu$ $100\mu < 19\% < 200\mu < 4\%$ | 99.1 |

[1] In percent by weight of Maddrell's salt obtained from $NaH_2PO_4$.
[2] Not determinable.

We claim:

1. In the process for the production of Maddrell's salt by heating monobasic sodium phosphate to temperatures up to about 450° C. in the presence of water vapor the improvement which comprises passing the monobasic sodium phosphate having a surface area of at least 0.1 square meter per gram through a heating zone, said heating zone having a temperature gradient increasing up to about 450° C., said monobasic sodium phosphate being passed through said temperature gradient of said heating zone so as to be increased in temperature of less than 50° C. per minute, reducing steam partial pressure in said monobasic sodium phosphate of between 50 and 450 mm. mercury and recovering a water-insoluble, dry finely grained Maddrell's salt.

2. The process of claim 1, wherein the said steam partial pressure within the critical temperature range between 200° and 450° C. is produced by regulating the heating rate.

3. The process of claim 2, wherein the heating rate is regulated by conveying the feed material through a heating zone having means for increasing the heating along the length of the zone.

4. The process of claim 1, wherein the steam partial pressure desired to prevail within the critical temperature range is produced by conveying a gas poor in steam over the feed material.

5. The process of claim 4, wherein the gas poor in steam is air.

6. The process of claim 1, wherein the feed material is heated at a heating rate of less than 30° C. per minute.

7. The process of claim 1, wherein the feed material is vacuum-dried $NaH_2PO_4 \cdot 2 H_2O$.

8. The process of claim 7, wherein the feed material is $NaH_2PO_4 \cdot 2 H_2O$ vacuum-dried at a pressure of less than 80 mm. mercury.

9. The process of claim 1, wherein the feed material is a spray-dried $NaH_2PO_4$-solution.

10. The process of claim 1, wherein, within the temperature range between 200° and 450° C., the reaction material normally in horizontal motion is imparted an additional rotary motion so as to accelerate steam diffusion.

* * * * *